No. 879,862.  
PATENTED FEB. 25, 1908.  
J. FUCHS.  
FRICTION CLUTCH.  
APPLICATION FILED NOV. 15, 1907.
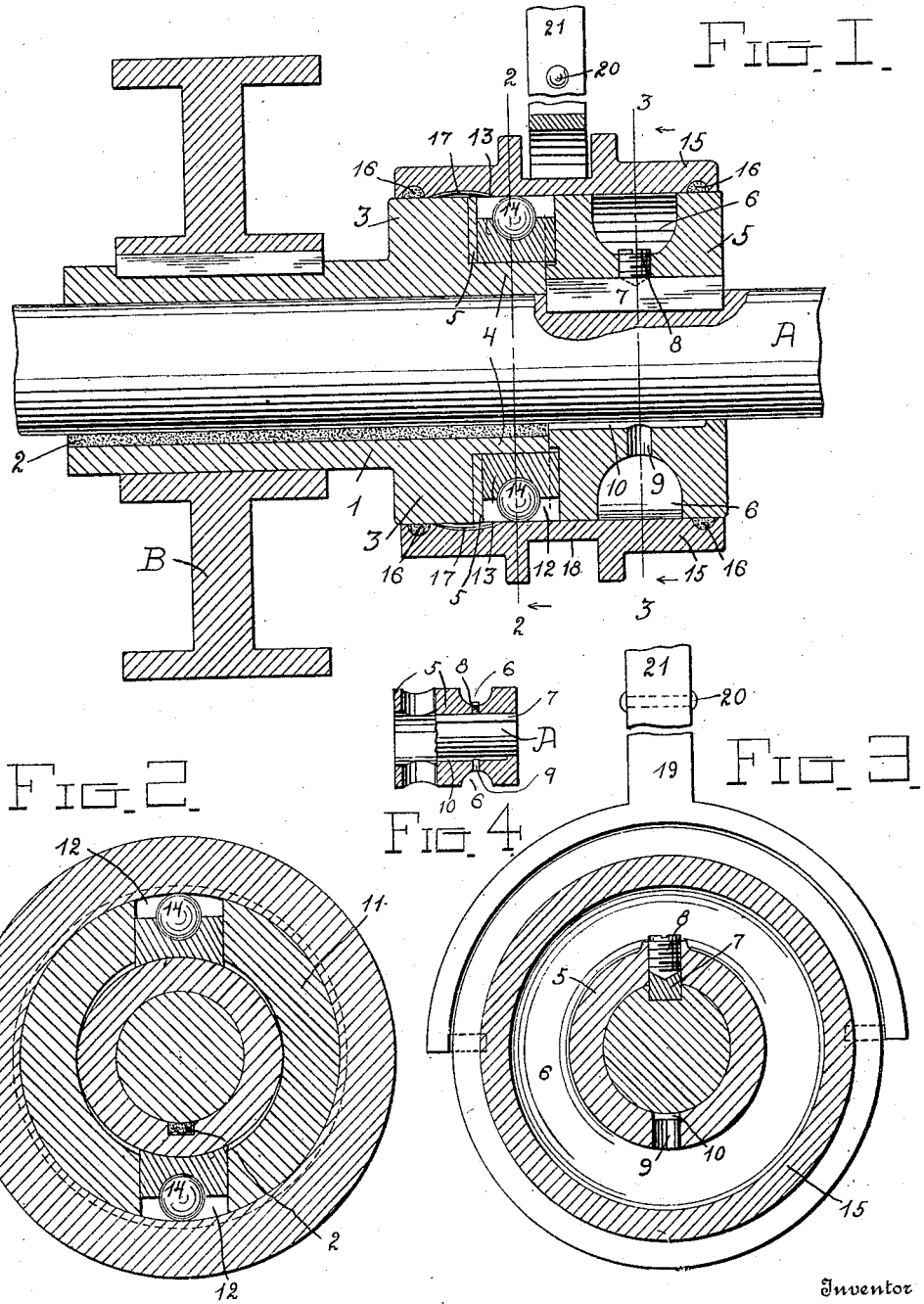
Inventor  
Joseph Fuchs,  
By C. L. Parker  
Attorney
Witnesses  
J. Milton Jester  
Myron F. Clear

UNITED STATES PATENT OFFICE.

JOSEPH FUCHS, OF CINCINNATI, OHIO.

FRICTION-CLUTCH.

No. 879,862.　　　　Specification of Letters Patent.　　　　Patented Feb. 25, 1908.

Application filed November 15, 1907. Serial No. 402,340.

*To all whom it may concern:*

Be it known that I, JOSEPH FUCHS, a citizen of the United States, residing at Cincinnati, in the county of Hamilton and State of Ohio, have invented certain new and useful Improvements in Friction - Clutches, of which the following is a specification.

My invention relates to a friction clutch adapted for use in connection with pulley shafts and the like, and particularly contemplates the provision of a simple and inexpensive construction which may be readily and quickly clutched or unclutched and which will be positive and unfailing in its action.

My invention further and specifically resides in the following features of construction, arrangement and operation to be hereinafter described with reference to the accompanying drawings forming a part of this specification, in which like numerals are used to designate like parts throughout the several figures thereof, and in which Figure 1 is a central longitudinal sectional view taken through my improved device and illustrating the same operatively held upon a pulley shaft or the like, Fig. 2 is a transverse sectional view taken therethrough on the line 2—2 of Fig. 1. Fig. 3 is a similar view taken therethrough on the line 3—3 of Fig. 1 and Fig. 4 is a central longitudinal sectional view, on a reduced scale, of the tight bush detached, and showing the shaft broken away therein.

In the practical embodiment of my invention I provide a pulley shaft or the like A with a loose sleeve bush 1 having longitudinal slots 2 cut in its internal surface and filled with a suitable absorbent material, for a purpose to be hereinafter described. The loose bush 1 is provided with a circular flanged portion 3 adjacent one end, and with a slightly reduced end 4 beyond said flanged portion, and having a slightly oval exterior surface. Mounted on the shaft A adjacent said reduced end 4 of said bush 1 is a tight bush 5 having a semi-circular relatively deep recess 6 extending around the peripheral face thereof and keyed to the shaft A by means of a movable key 7 extending within alined recesses in said shaft and in said bush 5 and securely held therein by a screw plug 8 threadedly arranged through the material of said bush from the recess 6. The bush 5 is provided opposite its screw plug 8 with an opening 9 extending therethrough from its recess 6 to a longitudinal slot 10 cut in its internal face. The recess 6 of the bush 5 is adapted to contain a suitable lubricant capable of advancing slowly through the opening 9 and the slot 10 thereof on to the shaft A and run through said slot 10 into the absorbent material within the slot 2 of the loose bush 1. The tight bush 5 is further provided with a circular flange 11 extending from its inner side about the reduced portion 4 of the loose bush 1, said flange having oppositely disposed openings 12 cut therein and extending approximately to the body portion of said bush 5, and adapted to receive therein movable clamping members 13 having semi-circular openings cut in the outer face thereof and adapted to receive loosely therein balls 14.

Mounted about the device and resting upon the outer circumferential surface of the tight bush 5 and the flanged portion 3 of the loose bush 1, and movable thereon, is an operating sleeve 15 provided with circular packing strips 16 secured within its internal surface bearing upon the tight bush 5 and the loose bush 1, and having also upon its internal surface a circular curved recess 17 for a purpose to be hereinafter described. The internal bore of the operating sleeve 15 is of such diameter that its unbroken internal surface will force the balls 14 within the opening 12 causing the clamping members 13 to frictionally engage the reduced end 4 of the loose bush 1, while when said operating sleeve 15 is moved to one side to allow a circular curved recess 17 to lie opposite said balls, said clamping members 13 are allowed to rotate loosely upon the reduced end 4 of the loose bush 1, with the tight bush 5, between the ends of the flange 11 of said tight bush. The operating sleeve 15 is provided on its external surface with a circular channel 18 within which the reduced angular ends of a yoke 19 engage, said yoke having an extending arm 21 pivoted at 20 and constituting an operating lever whereby the operating sleeve 15 may be moved in either direction to clutch or unclutch the device as described.

In the practical operation of my invention I provide the loose bush 1 with a pulley or the like B keyed thereto and adapted to transmit power when the loose bush 1 has been clutched.

The operation of the remainder of the device will be readily apparent, the same being shown in the clutched position in Fig. 1, and being adapted to be unclutched by simply moving the operating sleeve 15 slightly to the right by means of the lever 21 and yoke 19.

Having thus fully described my invention, I claim:

1. In a friction clutch of the character described, the combination of a shaft, a loose bush mounted on said shaft and provided with means for transmitting power, a tight bush secured to said shaft adjacent said loose bush, and having a circular flanged portion extending upon a portion of said loose bush and provided with slotted openings therein, clamping members disposed within said openings to bear upon said loose bush, and an operating sleeve slidably mounted upon portions of said tight and loose bushes and adapted to force said clamping members into tight engagement with said loose bush, said operating sleeve having recessed portions into which said clamping members may enter to disengage the same, substantially as described.

2. In a friction clutch of the character described, the combination of a shaft, a loose bush mounted on said shaft and provided with means for transmitting power, a tight bush secured to said shaft adjacent said loose bush and having a circular flanged portion extending upon a portion of said loose bush and provided with slotted openings therein, clamping members disposed within said opening to bear upon said loose bush, an operating sleeve slidably mounted upon portions of said tight and loose bushes and adapted to force said clamping members into tight engagement with said loose bush, said operating sleeve having recessed portions in which said clamping members may enter to disengage the same, and an operating lever for moving said sleeve, substantially as described.

3. In a friction clutch of the character described, the combination of a shaft, a loose bush mounted on said shaft and provided with means for transmitting power, a tight bush secured to said shaft adjacent said loose bush and having a circular flanged portion extending upon a portion of said loose bush and provided with slotted openings therein, clamping members disposed within said openings to bear upon said loose bush, and an operating sleeve slidably mounted upon portions of said tight and loose bushes and adapted to force said clamping members into tight engagement with said loose bush, said operating sleeve having recessed portions into which said clamping members may enter to disengage the same, one of said bushes being provided with a reservoir adapted to contain a lubricant, and with an opening extending from said reservoir through its internal surface, to lubricate the said shaft, substantially as described.

4. In a friction clutch of the character described, the combination of a shaft, a member loosely mounted upon said shaft, a member secured upon said shaft and provided with a portion thereof projecting upon and surrounding a reduced portion of said loose member and provided with slotted openings, clamping members mounted within said openings, and an operating member surrounding said tight and loose members to force said clamping members inwardly into frictional engagement with said reduced portion of said loose member, substantially as described.

5. In a friction clutch of the character described, the combination of a shaft, a member loosely mounted upon said shaft, a member secured upon said shaft and provided with a portion thereof projecting upon and surrounding a portion of said loose member and provided with slotted openings therein, clamping members mounted within said openings, and an operating member to force said clamping members inwardly into frictional engagement with said loose member, said operating member being provided with means to allow said clamping members to move away from said loose bush to disengage the same, substantially as described.

In testimony whereof I affix my signature in presence of two witnesses.

JOSEPH FUCHS.

Witnesses:
 HARRY L. LINCH,
 GLENDENNING B. GROESBECK.